United States Patent
Doisy et al.

(10) Patent No.: US 7,286,443 B2
(45) Date of Patent: Oct. 23, 2007

(54) FAST COHERENT PROCESSING FOR CODES WITH PERIODIC LINE SPECTRA

(75) Inventors: Yves Doisy, Grasse Plascassier (FR); Pierre Alinat, Vence (FR); Laurent Deruaz, Mouans Sartoux (FR); Marc Masoni, Juan les Pins (FR)

(73) Assignee: Thales, Neuilly -sur Seine (FR)

( * ) Notice: Subject to any disclaimer, the term of this patent is extended or adjusted under 35 U.S.C. 154(b) by 103 days.

(21) Appl. No.: 11/176,674

(22) Filed: Jul. 8, 2005

(65) Prior Publication Data

US 2007/0008818 A1     Jan. 11, 2007

(30) Foreign Application Priority Data

Jul. 9, 2004     (FR)     .................... 04 07706

(51) Int. Cl.
G01S 15/52     (2006.01)
G01S 7/527     (2006.01)

(52) U.S. Cl. ...................................... 367/90
(58) Field of Classification Search ............... 367/90; 342/189, 192, 196
See application file for complete search history.

(56) References Cited

U.S. PATENT DOCUMENTS

| | | |
|---|---|---|
| 5,101,383 A | 3/1992 | Doisy et al. |
| 5,428,581 A | 6/1995 | Doisy et al. |
| 5,557,637 A | 9/1996 | Glynn |
| 6,072,423 A | 6/2000 | Doisy et al. |
| 6,314,053 B1 | 11/2001 | Doisy et al. |
| 2007/0008818 A1 * | 1/2007 | Doisy et al. .................. 367/90 |

FOREIGN PATENT DOCUMENTS

EP     1615049 A1 *     1/2006

OTHER PUBLICATIONS

Francis Chan, et al. "A Non-Linear Phase-Only Algorithm for Active Sonar Signal Processing", Oceans '97, MTS/IEEE Conference Proceedings Halifax, Canada Oct. 6-9, 1997, IEEE, U.S., vol. 1, Oct. 6, 1997, pp. 506-511.

J-P. Hermand, "Model-Based Matched Filter Processing for Delay-Doppler Measurement in a Multipath Dispersive Ocean Channel", Oceans '93, Engineering in Harmony with Ocean Proceedings Victoria, BC, Canada Oct. 18-21, 1993, IEEE, Oct. 18, 1993, pp. 1306-1311.

K. Mio, et al., "Space Time Adaptive, Processing for Low Frequency Sonar", Conference Proceedings Article, vol. 2, Sep. 11, 2000, pp. 1315-1319.

* cited by examiner

Primary Examiner—Daniel Pihulic
(74) Attorney, Agent, or Firm—Lowe Hauptman & Berner, LLP

(57) ABSTRACT

The present invention is directed to a method of allowing a computational load caused by the implementation of conventional signal processing methods operating by multicopy correlation, by simultaneous correlation of the spectrum of the received signal to copies of the signal, each of the copies having a different Doppler shift. The multicopy correlation operation is a time-frequency transformation of the received signal. Synthetic spectra are found by selection of spectral lines and concatenation, starting from the spectrum of the received signal. An inter-spectral product is computed, in other words by the product of each synthetic spectrum with the concatenated conjugate spectrum of the corresponding Doppler copy. A frequency-time transformation of the inter-spectral products is performed.

7 Claims, 6 Drawing Sheets

FAST COHERENT PROCESSING FOR CODES WITH PERIODIC LINE SPECTRA

RELATED APPLICATION

The present application is based on, and claims priority from, French Application Number 04 07706, filed Jul. 9, 2004, the disclosure of which is hereby incorporated by reference herein in its entirety.

BACKGROUND OF THE INVENTION

The field of the invention is that of sonar signal processing methods. The invention relates more particularly to sonar echoes coming from objects that are irradiated by sonar emissions with a 'comb' line spectrum composed of spectral lines.

One technique exploiting sonar signals, known from the prior art, consists in emitting a known signal into the medium and in processing the received signals by correlation with signals representing replicas of the emitted signal when it is reflected by a moving target and received by the sonar. These replicas, or Doppler copies, are correlated with the signal actually received so as to distinguish the signal coming from the target from the background noise and from reverberation.

The emission of signals having a line spectrum, in other words a spectrum composed of distinct lines, is furthermore of considerable interest for the detection of fast or slow moving underwater targets in an environment limited by reverberation. Indeed, as long as the Doppler shift of the targets is larger than the width of the elementary lines of the spectrum, it allows the reverberation noise to be reduced by Doppler filtering. Such a Doppler filtering process is notably described in the European Patent EP1078280 that relates to a method for detecting moving objects by means of an active sonar.

This type of Doppler filtering consists in carrying out a multicopy correlation of the received signal. Multicopy correlation consists in performing, in a known manner, correlation operations of the received signal with various replicas, or Doppler copies, of the emitted signal. Each Doppler copy exhibits the same spectrum as the signal reflected by an object with a given velocity, which is why they are referred to as Doppler copies of the emitted signal.

The correlation operations are carried out simultaneously, or else during the same period of time, such that the exploitation, in active sonar mode, of emissions of line-spectrum signals leads to as many simultaneous correlation operations being performed as doppler filters are used. Consequently, where the number of Doppler copies employed is large, the multicopy correlation processing mode may require a large computing capacity.

Furthermore, it is known that, for signals whose BT product is large, greater than 50 for example, the Doppler filtering operation by correlation can advantageously be performed in the spectral domain. The letters B and T of the BT product respectively denote the emitted signal band B and its duration T. Indeed, transferring into the spectral domain, for example by means of a Fast Fourier Transform (FFT), turns out to be more advantageous, in terms of computational load, than a direct correlation in the time domain.

Nevertheless, when the correlation is performed with several Doppler copies, this embodiment of doppler filtering leads to a computational load that is still far too high. With this in mind, it will be recalled that the increase in computational load implied by multicopy processing is substantially proportional to the number of copies employed. In practice, the number of copies is of the order of several tens, or even several hundreds. The French Patent Application 03 0404042, filed in April 2003 by the Applicant, mentions in this regard a number of doppler copies greater than 200 required for the doppler filtering.

SUMMARY OF THE INVENTION

The present invention consists of a method allowing the computational load caused by multicopy correlation to be reduced. For this purpose, the method according to the invention performs a multicopy correlation operation comprising at least the following steps:

a step for the time-frequency transformation of the received signal;

a step for the formation of synthetic spectra, each synthetic spectrum being formed by the choice of certain spectral components from the spectrum of the received signal and concatenation of these spectral components;

a step for the computation of the inter-spectral product, which is the product of each synthetic spectrum with the concatenated conjugate spectrum of the corresponding doppler copy;

a step for performing the multicopy correlation operation where the product of the concatenated conjugate spectrum of each doppler copy with the synthetic spectrum of the corresponding received signal is computed;

a step for carrying out the frequency-time transformation of the inter-spectral products obtained, allowing the system to return to the time domain.

The method according to the invention has the advantage of only performing the multicopy correlation on the useful portions of the spectra. By eliminating unnecessary computations, it thus allows the number of computations effected to be substantially reduced, especially during the inter-spectral computation and frequency-time transformation steps. It thus allows the total number of computations carried out to be reduced or, put another way, for the same number of computations, a doppler filtering operation with higher resolution to be performed.

The method according to the invention has the additional advantage of being simple to implement. It is also particularly adapted to systems emitting waves whose spectrum is composed of periodic lines, each line itself possessing an elementary spectrum.

DESCRIPTION OF THE DRAWINGS

Other features and advantages will become apparent through the description illustrated by the associated figures which show.

DETAILED DESCRIPTION

Figure 1:
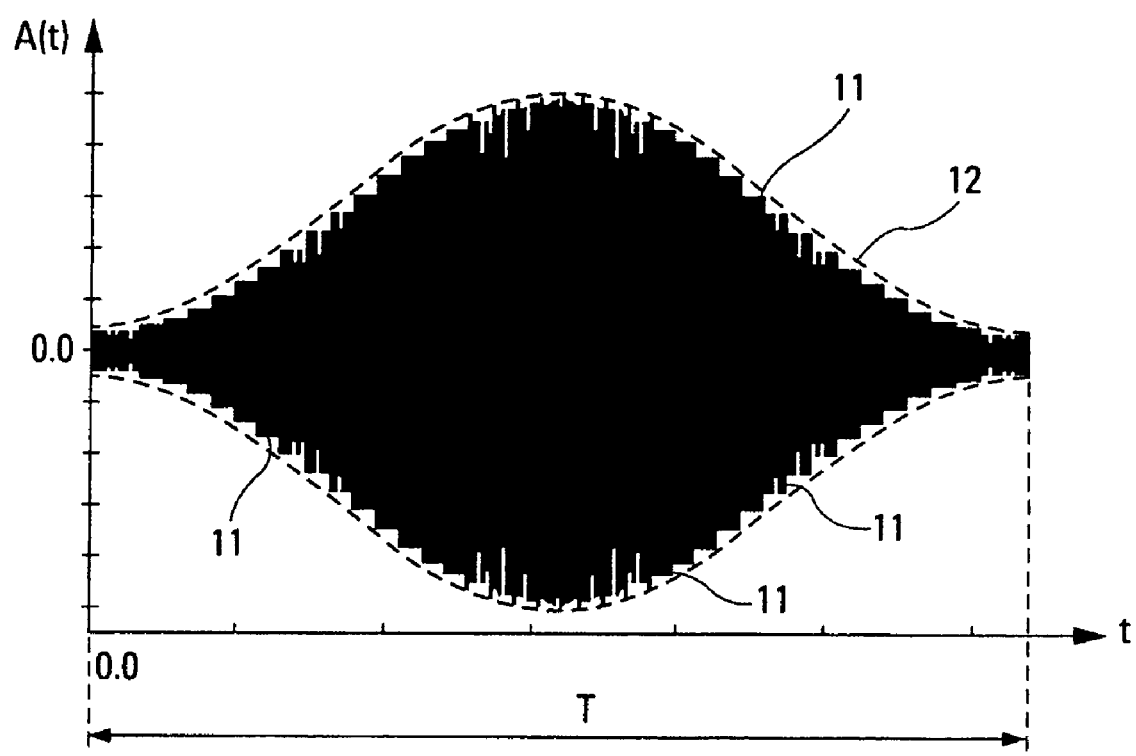
FIG. 1, the temporal representation of an example of signal having a line spectrum.

As was stated previously, the method according to the invention can be applied, in particular, to active sonar systems emitting waves whose spectrum takes the form of a regular succession, along the frequency axis, of elementary spectra or lines. For clarity of the description, the invention is described in the document through a preferred exemplary embodiment in which the emitted wave takes the form of pulses formed from the weighted sum of N successive elementary pulses modulated in frequency according to the same law, linear or hyperbolic for example. An illustration in the time domain of a pulse of this type is presented in FIG. 1. In this figure, the N elementary pulses 11 can be seen whose amplitude is determined by the weighting law applied. This weighting defines an envelope a(t) 12 and conditions the form of the spectrum of the pulse thus generated. The signal formed, of duration T, is thus composed of N pulses of duration T/N. The object of the weighting applied to the whole of the signal is to control the spectral width of the emitted signal and, in particular, to reduce the level of the secondary spectral lines. Consequently, the emitted signal can be expressed by the following equation:

$$e(t) = a(t) \sum_{n=0}^{N-1} p\left(t - n\frac{T}{N}\right) \quad [1]$$

where p(t) is the expression of an elementary pulse, p(t) being equal to 0 when t is outside of the interval [0 T/N]. The signal a(t) represents the weighting applied, which is referred to as the signal envelope. As regards the spectrum of the emitted signal, this can be expressed by the following equation:

$$E(f) = A(f) * \sum_n P(f) \exp\left(-i n 2\pi f \frac{T}{N}\right) = \sum_n P\left(\frac{nN}{T}\right) A\left(f - n\frac{N}{T}\right) \quad [2]$$

In equation [2], P(f) represents the spectrum of the elementary pulse which can be expressed by:

$$P(f) = \int p(t) \cdot \exp(-2i\pi f t) dt \quad [3].$$

Similarly, the spectrum of the envelope a(t) of the emitted signal can be expressed by:

$$A(f) = \int a(t) \cdot \exp(-2i\pi f t) dt \quad [4]$$

Figure 2:
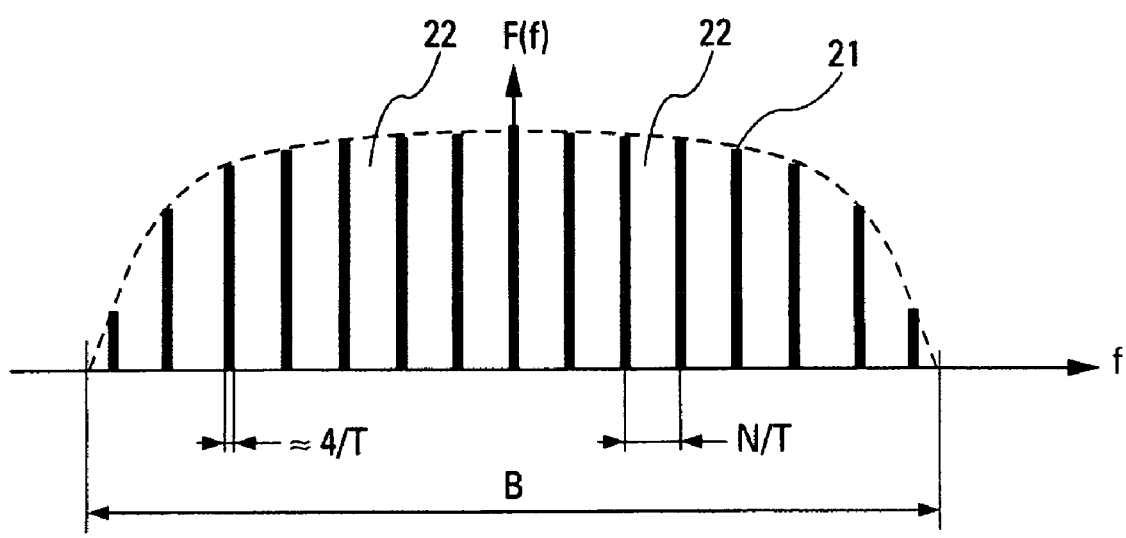
FIG. 2, the schematic spectral representation of the signal illustrated by FIG. 1.

The spectrum E(f) is shown schematically in FIG. 2. Its total width is the band B of the elementary pulse. It is composed of spectral lines 21 positioned every n*N/T along the frequency axis.

The amplitude weighting a(t) has the effect of limiting the width of the spectrum of each line to an interval β/T around the central frequency. The factor β represents a coefficient that depends on the amplitude weighting law a(t) chosen. If, for example, it is taken, according to a preferred embodiment, that $a(t) = \sin^2(\pi t/T)$, the coefficient β will take the value β=4.

The illustration in FIG. 2 demonstrates that the spectrum of the emitted signal comprises BT/N frequency ranges of width β/T, corresponding to the spectral lines 21, for which the amplitude of the spectrum is significant, separated by frequency ranges 22 of width substantially equal to N/T, in which the amplitude of the spectral components is very low. It can also be observed that these ranges of very low amplitude represent a significant fraction of the band of the emitted signal. This distinctive distribution of the spectral amplitude is advantageously exploited by the method according to the invention.

Generally speaking, a known means of performing the doppler analysis of the received signal in the field of sonar echo processing consists in performing the correlation of the received signal with signals representing copies of the emitted signal but with a frequency shift or phase shift corresponding to the shift that the emitted signal would have undergone during its reflection on a moving target. In this type of processing by multicopy correlation, the number of doppler copies employed depends on the frequency range to be analyzed and on the code resolution. This number also depends on the computing capacity of the machine that must perform the corresponding arithmetic operations, This twin dependency leads, in practice, to a difficult compromise being made between the desired quality of the doppler analysis and the computation time required to obtain the result.

Figure 3:
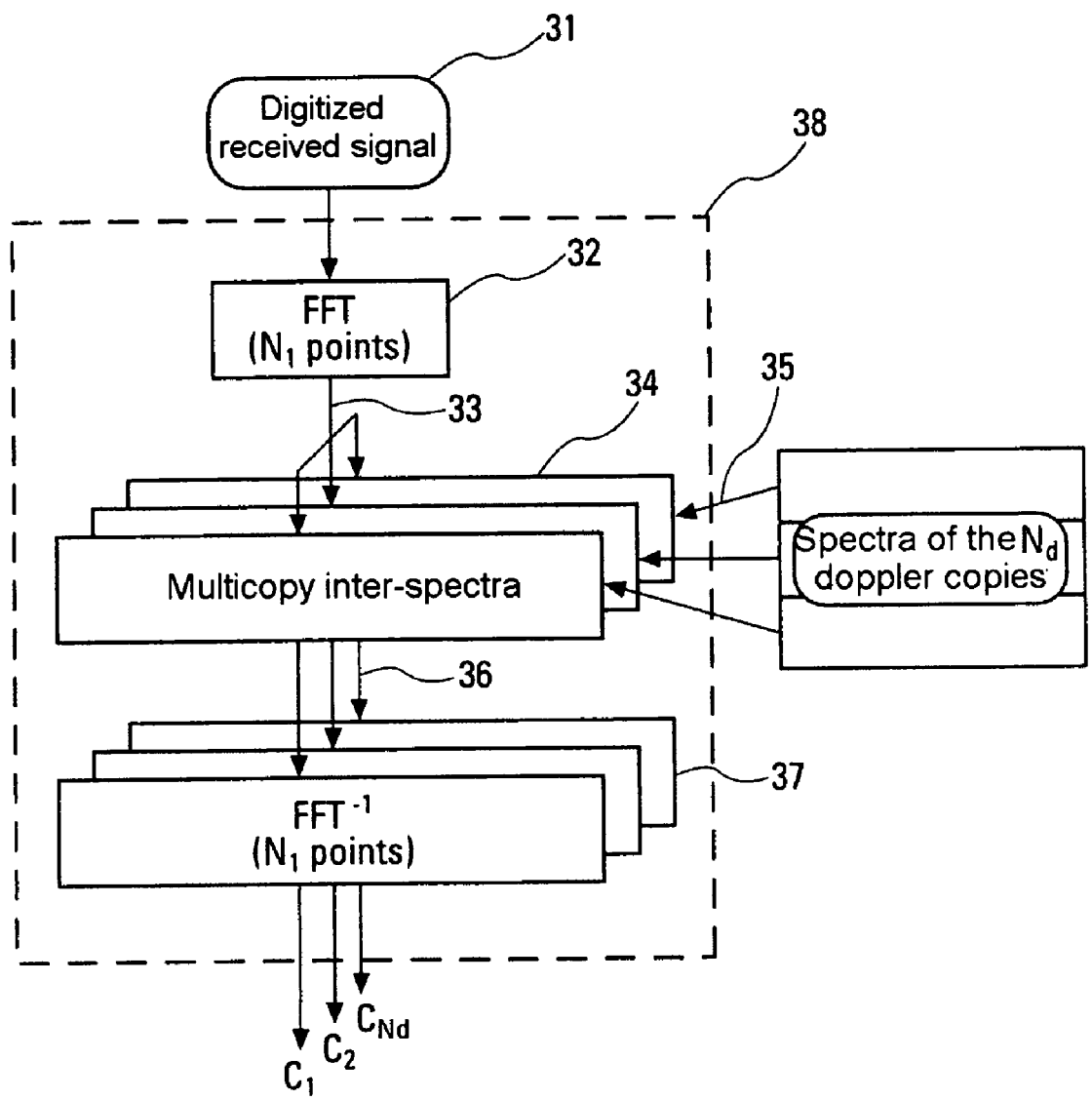
FIG. 3, an illustration of the main steps of a conventional multicopy correlation method, the correlation being performed in the spectral domain.

FIG. 3 shows the schematic flow diagram of a conventional processing method by multicopy correlation. With the aim of limiting the number of computations to be performed, this operation is carried out in the frequency domain. For this purpose, the digitized received signal 31 undergoes, for example, a time-frequency transformation 32. In a preferred embodiment, the time-frequency transformation is effected by means of a Fast Fourier Transform (FFT) carried out in a sliding window mode over a number of points $N_1$ determined by the desired number of doppler channels. The FFT operation can for example be carried out in a sliding window mode over a number of samples $N_1 = 2 \cdot F_e \cdot T$, with a slide window equal to $F_e \cdot T$ samples from one FFT operation to the next. In this case, $F_e$ represents the sampling frequency and T the duration of the received signal.

The frequency signal 33 thus obtained is then subjected to several simultaneous correlation operations 34. Each operation consists in calculating, in a known manner, the interspectral resultant of the product of the spectrum of the received signal with the spectrum of a stored signal 35, called doppler copy. The spectrum of each doppler copy corresponds to that of the emitted signal having undergone a homothetic transformation in frequency. The homothetic frequency transformation corresponds to one of the channels of the doppler band analyzed.

Each doppler copy can be characterized by the doppler parameter δ defined by the expression δ=1±2V/c in which V represents the radial velocity of the target with respect to the vessel carrying the sonar and c the speed of sound in the medium. It can then be expressed as:

$$c(t) = e(\delta t) = a(\delta t) \sum_{n=0}^{N-1} p\left(\delta t - n\frac{T}{N}\right) \quad [5]$$

and its spectrum obeys the expression:

$$C(f) = \frac{1}{|\delta|} \cdot A(f/\delta) * \sum_n P(f/\delta) \exp\left(-2i\pi n f \frac{T}{N}\right) \quad [6]$$

-continued $$= \sum_n P\left(\frac{nN}{T}\right) A\left(\frac{f}{\delta} - n\frac{N}{T}\right)$$

The expression for C(f) is analogous to that of E(f), except that it is composed of lines centered on the frequencies δ·n·N/T which represents a simple homothetic transformation of the spectrum.

The result 36 of each correlation operation is then transposed into the time domain in order to be exploited. The transposition is preferably carried out by the inverse transformation 37 of that used for transferring into the frequency domain, by a frequency-time transformation of the inverse DFT or inverse FFT type or other, performed over $N_1$ samples or points.

As in the case of the emitted signal, it is observed that the spectra of the doppler copies are non-zero over BT/N frequency ranges corresponding to the lines of the spectrum of the emitted signal translated in frequency. As for the emitted signal, the width of each spectral line is equal to β/T, the lines being separated by δN/T on the frequency axis.

Performing the multicopy correlation computation amounts to performing $N_d$ simultaneous correlation operations, in other words, in the spectral domain, $N_d$ inter-spectral multiplication operations. Transferring into the spectral domain advantageously allows the time correlation operations, which involve in a known manner the sums of products, to be replaced by simple multiplication operations that are less complex and hence less costly in terms of computational load. Nevertheless, since it involves $N_d$ simultaneous operations, the load remains high. It will be recalled, in this respect, that the size of the computational load depends on the number $N_d$ of doppler channels to be processed and also on the product BT, where B represents the bandwidth of the elementary pulse 11 and T the duration of the N elementary pulses making up the emitted signal.

The flow diagram in FIG. 3 allows the relative weighting in the total computational load to be handled for each step of the method to be highlighted. It will thus be observed that the steps corresponding to the operations 34 and 37 have a weighting that is very sensitive in the computational load, both in terms of the number of computations required by each operation and in terms of the simultaneity of their execution for each of the $N_d$ doppler channels. By comparison, the step corresponding to the operation 32 for the FFT frequency analysis of the received signal only has a low relative weight.

In the case where the acceptable computational load does not allow the multicopy correlation operation such as that described to be performed, the conventional processing method illustrated by FIG. 3 at first sight only offers two types of solution. A first solution therefore consists in decreasing the number of doppler channels utilized simultaneously, which allows the number $N_d$ of correlation operations performed simultaneously to be reduced. The other solution consists in limiting the bandwidth occupied by the elementary pulse which may be incompatible with the demands associated with the signal processing functions employed elsewhere.

Faced with these constraints, the method according to the invention proposes a solution which is an alternative to the aforementioned solutions. For this purpose, the principle of the method according to the invention mainly consists in considering the spectrum of the emitted signal as an assembly of elementary spectra formed by the spectral lines 21 composing the global spectrum. These elementary spectra are separated by frequency ranges which are redundant in the doppler processing and for which the signal level is very low. Similarly, since the received signal is correlated with doppler-shifted copies of the emitted signal, the inter-spectrum obtained also comprises frequency ranges for which the frequency components are very weak. This consideration allows the notion of effective bandwidth to be introduced, which can be defined by the following equation:

$$B_{eff} = \frac{BT}{N} * \frac{\beta}{T} = \frac{\beta B}{N} \qquad [7]$$

In the above equation, the effective band $B_{eff}$ is defined as the product BT/N of the number of lines making up the signal spectrum with the spectral width βB/N of a line.

The notion of effective bandwidth, such as is defined here, allows the fact that all the samples that are useful for performing a doppler analysis of the received signal, by digital correlation in the spectral domain, are not contained in B, but in $B_{eff}$ to be taken into account.

The method according to the invention takes advantage of this observation in order to reduce the computation power required for performing the multicopy correlation operation. For this purpose, the method according to the invention includes a step comprising an operation for concatenating spectra. The object of this operation is to substitute for the received signal and for each doppler copy a synthetic signal whose spectrum is contained within a band equivalent to the previously-defined band $B_{eff}$. For each copy, the synthetic spectrum comprises all the non-zero level frequency components of the original signal. The illustration in FIG. 4 allows, in a simple manner, the role of the step for concatenating the spectra of the doppler copies to be clarified.

Figure 4:
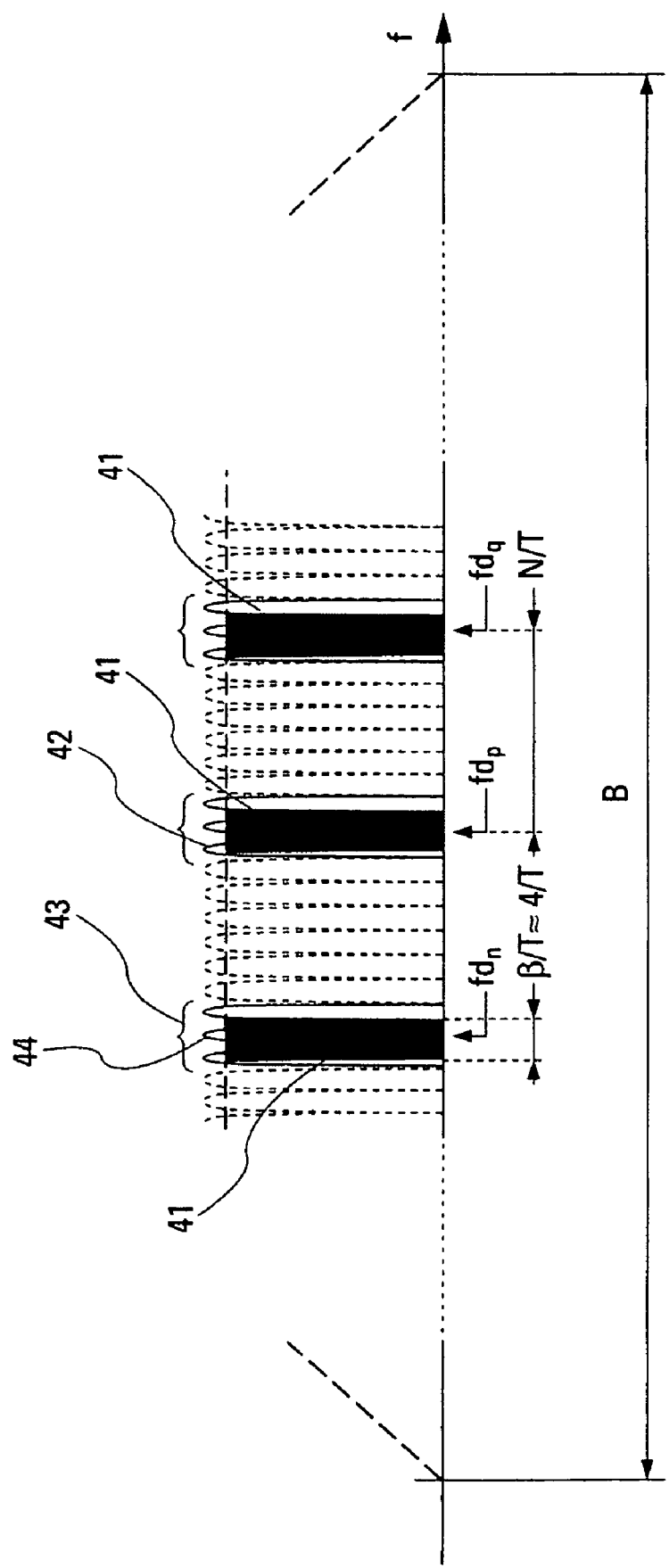
FIG. 4 also shows a partial view of the spectrum in FIG. 2 and of the set of the doppler channels defined by the frequency analysis operation carried out on the signal.

FIG. 4 shows a magnified partial view of the real spectrum of the signal shown in FIG. 2. In this FIGURE, only three spectral lines 41 are shown, which could be any three lines taken from among the lines making up the spectrum of a signal such as, for example, the signal emitted by the sonar or else one of its doppler copies. FIG. 4 also shows a partial view of the whole set of frequency channels 42 defined by the frequency analysis operation performed on the signal. This frequency analysis can, for example, be carried out by an operation of the FFT type.

The concatenation step is carried out simultaneously for each Doppler copy, each having a different line spectrum. It can be broken down into a certain number of operations. A first operation consists in determining the frequency channels 42 coinciding with the spectral lines 41, of known position, which make up the spectrum of the copy. The spectral band occupied by each of the lines is thus covered by a set 43 of adjacent frequency channels whose number notably depends on the resolution of the frequency analysis initially carried out. This group of doppler channels 43 comprises the minimum number of channels necessary and its spectral width is, in practice, substantially equal to that of the line 41 in question.

Generally speaking, as illustrated in FIG. 4, the spectral band occupied by a line 41 of the spectrum of the analyzed signal is not necessarily centered on the central frequency of a frequency channel. Moreover, the spectral width of a line is greater than the width of a doppler channel. This is the reason why, in order to cover the band occupied by a spectral line, several adjacent frequency channels need to be considered. The minimum number of channels required is determined by the width of the line in question and by the size of the doppler channels.

The groups of adjacent doppler channels 43 corresponding to each of the lines being thus determined, the concatenation operation itself consists in eliminating, from the spectral representation of the signal, the components situated in the intermediate frequency channels that do not belong to any group formed, and in re-forming a spectral representation of the signal by juxtaposing the remaining components. This representation can be considered as that of the effective spectrum of the copy in question.

Figure 5:
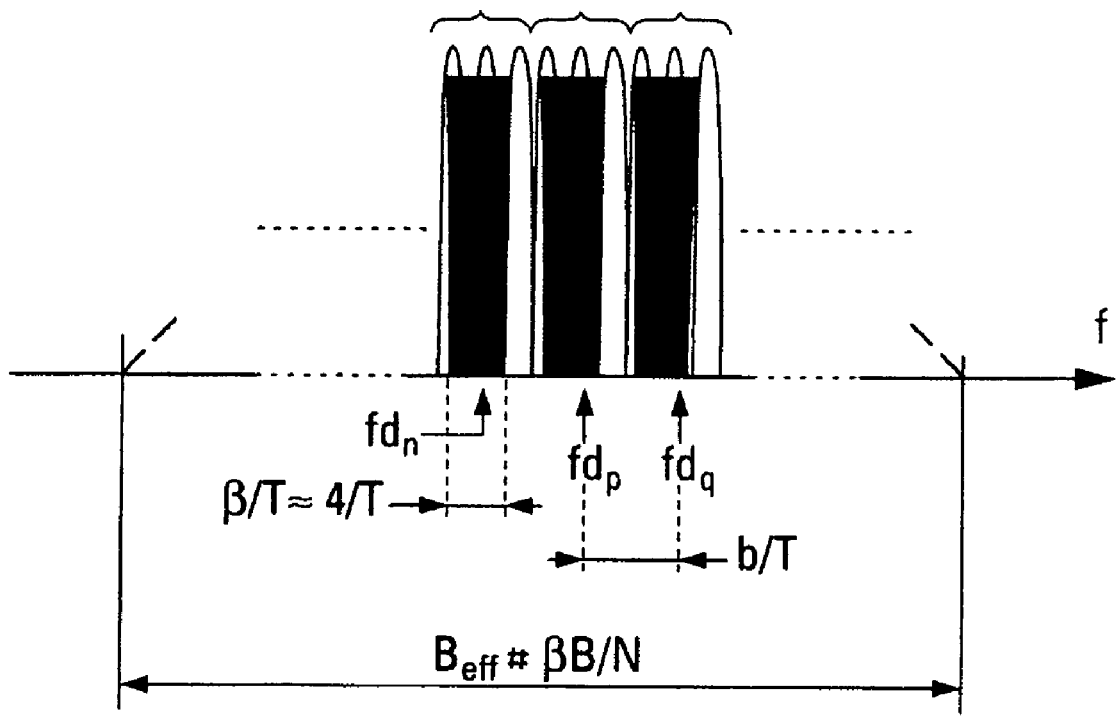
FIG. 5, the concatenated spectral representation of the signal illustrated by FIG. 1.

As is shown by FIG. 5, this spectral representation takes the form of an assembly of lines of width β/T, separated from one another by a frequency interval b/T substantially equal to β/T. This interval is, in reality, defined by the number of frequency channels conserved around each spectral line. The whole of the spectrum thus formed has a spectral width substantially equal to βB/N.

Figure 6:
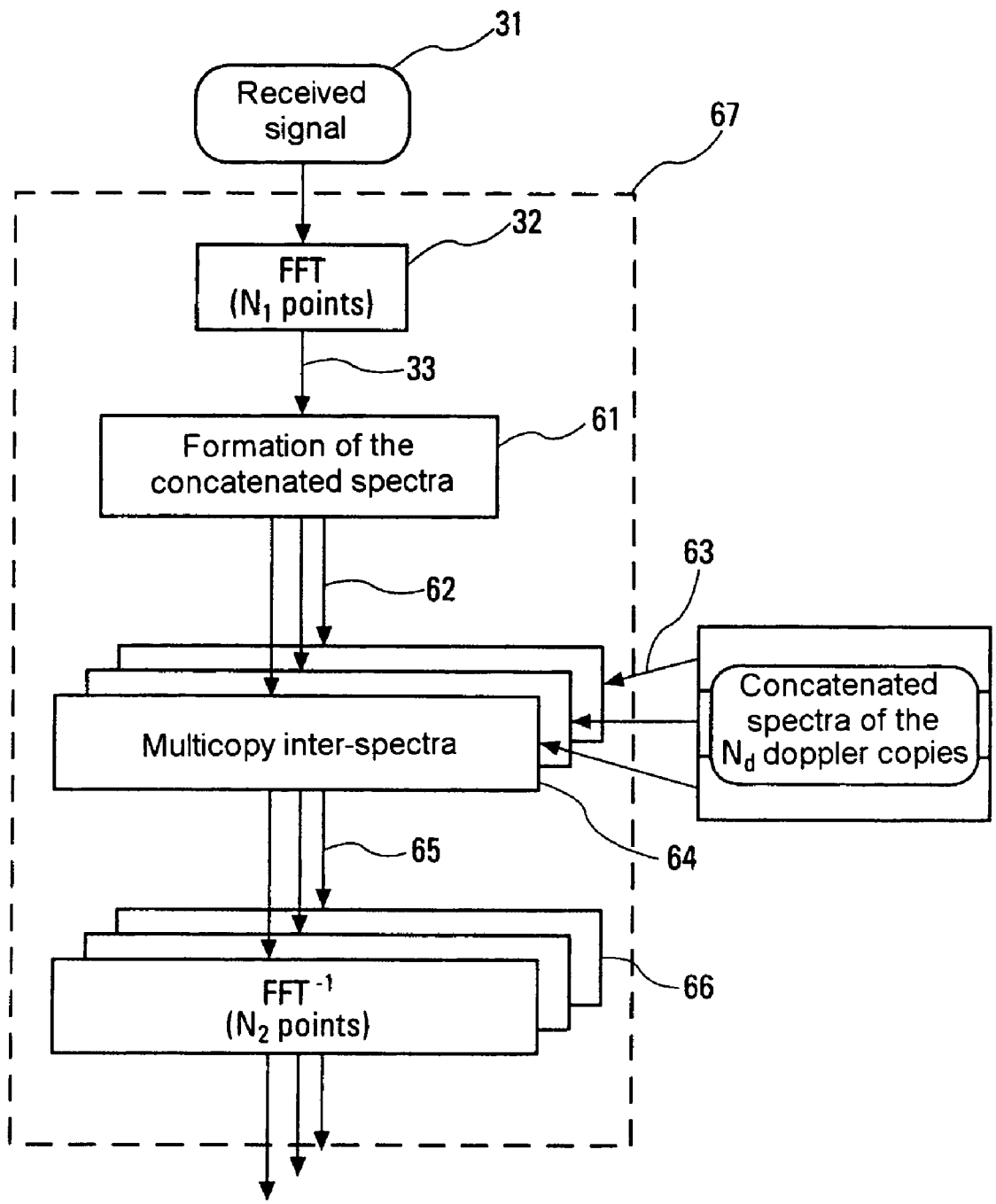
FIG. 6, the flow diagram of the main steps of the method according to the invention.

The concatenation step such as is described thus advantageously makes it possible to reduce the spectrum of the signal or signals to be processed. The method according to the invention employs the concatenation of spectra in the manner illustrated by FIG. 6 which displays a flow diagram of the steps that the method comprises.

According to the invention, the received signal undergoes a spectral decomposition 32, for example of the FFT type. The spectral decomposition of the received signal is preferably identical to that having been used to establish the spectra of the copies of the received signal. Furthermore, the concatenated spectra 63 of the frequency replicas of the emitted signal are available in the form of stored data, each concatenated spectrum comprising a set of given frequency channels. These channels are, for example, identified by a number representing their order in the series of channels 42 covering the band B of the signal.

The spectrum 33 of the received signal 32 then goes through a step for the formation of concatenated spectra 62, each concatenated spectrum 62 combining the frequency components situated within the same frequency channels as those retained for forming the concatenated spectrum of the doppler copy 63 with which it must be correlated.

The method then comprises an inter-spectra computation step 64, performed in a conventional manner, which consists, as before, in calculating in a known manner the inter-spectrum resulting from each product of a synthetic spectrum of the received signal with the corresponding conjugate spectrum of the stored doppler copy 35 of the emitted signal. The method according to the invention thus advantageously effects each product of spectra, not on the original spectra, but on the concatenated spectra. Since the concatenated spectra comprise a number N2 of spectral components, less than the number N1 from the original spectra, the multicopy correlation operation leads to a computational load that is smaller than in the case of a conventional method.

The inter-spectra 65 obtained then undergo a frequency-time transformation step 66, of the inverse FFT type for example, in order to restitute the time signals representing the correlation products. This operation is carried out simultaneously on all the inter-spectra calculated from the concatenated spectra of the received signal and from the doppler copies. This inverse transformation is similar, in its principle, to those implemented in the known methods of the prior art. However, it should be noted that, in the case of a transformation by inverse FFT, the operation is carried out on inter-spectra comprising fewer components, which reduces the size of the FFT to be performed and hence the number of computations required. These FFT operations are carried out on the number $N_2$ of frequency samples within an inter-spectrum or, in actual practice, on a number $2^P$ of samples corresponding to the power of 2 which is the closest to this number. The number of samples available is, in the latter case, completed by the addition of samples equal to zero. Thus, as for the inter-spectral correlation step, the effect of the concatenation results in a substantial reduction in the number of operations to be carried out, the order of magnitude of the reduction being given by the ratio N/β. The spectral analysis can be carried out more generally by a Discrete Fourier Transform (DFT) that is not necessarily applied to a number of points equal to a power of 2.

The method according to the invention, such as is described in the above, therefore allows the number of arithmetic operations required to perform the doppler analysis of the received signal to be substantially reduced, as long as the emitted signal has a line spectrum and where it has a weighted distribution allowing the spectral width of each line to be limited. The reduction advantageously applies to the correlation and frequency-time transformation steps which are the determinant steps of the method in terms of computational load.

This method has the advantage of being particularly adapted to the signals coming from emissions taking the form of a burst of N consecutive pulses over time, each pulse being frequency-modulated over a band B centered on a frequency $f_0$.

The invention claimed is:

1. A method for the Doppler processing of echoes of emitted signals, these emitted signals having a line spectrum, for performing a multicopy correlation of a received signal, comprising the following steps:
   time-frequency transformation of the received signal;
   formation of synthetic spectra by concatenation, starting from the spectrum of the received signal;
   computation of an inter-spectral product, by the product of each synthetic spectrum with the concatenated conjugate spectrum of a corresponding Doppler copy; and
   frequency-time transformation of the inter-spectral products.

2. The method as claimed in claim 1, wherein for each doppler copy, the concatenated spectrum of said copy is obtained by selecting, for each spectral line making up the signal, a frequency channel closest to the position of the line, by also selecting the adjacent frequency channels, by eliminating the other frequency channels and by concatenating the frequency ranges corresponding to the selected frequency channels.

3. The method as claimed in claim 2, wherein each synthetic spectrum is obtained by selecting and by concatenating frequency ranges corresponding to the frequency channels that are selected in order to obtain the concatenated spectrum of the corresponding Doppler copy.

4. The method as claimed in claim 1, wherein the frequency-time transformations of the inter-spectral products are performed by means of an inverse FFT carried out on a number $N_2$ of samples equal to the number of frequency channels making up the Doppler copies.

5. The method as claimed in claim 4, wherein the inverse FFT is performed on a set of M samples formed by the $N_2$ samples corresponding to the frequency channels of the concatenated spectrum to which channels M-$N_2$ zero samples are added such that M is equal to the power of two immediately above $N_2$.

6. The method as claimed in claim 3, wherein the frequency-time transformations of the inter-spectral products are performed by means of an inverse FFT carried out on a number $N_2$ of samples equal to the number of frequency channels making up the Doppler copies.

7. The method as claimed in claim 2, wherein the frequency-time transformations of the inter-spectral products are performed by means of an inverse FFT carried out on a number $N_2$ of samples equal to the number of frequency channels making up the Doppler copies.

* * * * *